US006890301B2

(12) United States Patent
Jago et al.

(10) Patent No.: US 6,890,301 B2
(45) Date of Patent: May 10, 2005

(54) DIAGNOSTIC ULTRASONIC IMAGING SYSTEM HAVING COMBINED SCANHEAD CONNECTIONS

(75) Inventors: James Jago, Seattle, WA (US); Gary Schwartz, Seattle, WA (US); Derek Henderson, Mill Creek, WA (US); Malcolm Harnois, Brier, WA (US); John Stice, Redmone, WA (US); Doug Maxwell, Woodinville, WA (US)

(73) Assignee: Koninklijke Philips Electronics NV, Eindhoven (NL)

( * ) Notice: Subject to any disclaimer, the term of this patent is extended or adjusted under 35 U.S.C. 154(b) by 135 days.

(21) Appl. No.: 10/091,952

(22) Filed: Mar. 5, 2002

(65) Prior Publication Data

US 2003/0171674 A1 Sep. 11, 2003

(51) Int. Cl.$^7$ ................................................ A61B 8/00
(52) U.S. Cl. ...................................... 600/437; 600/447
(58) Field of Search ................................. 600/437, 443, 600/447, 444, 445, 432, 449, 455, 456, 459, 128, 916; 73/625–626; 370/276, 294–5, 464, 468, 537, 542; 310/317–318; 367/105, 122, 135, 137

(56) References Cited

U.S. PATENT DOCUMENTS

| | | | | |
|---|---|---|---|---|
| 4,041,422 A | * | 8/1977 | Marquardt | 334/49 |
| 4,170,766 A | * | 10/1979 | Pridham et al. | 367/135 |
| 4,187,493 A | * | 2/1980 | Patterson | 367/135 |
| 4,519,250 A | * | 5/1985 | Sumino | 73/626 |
| 4,641,660 A | | 2/1987 | Bele | 128/660 |
| 5,081,993 A | * | 1/1992 | Kitney et al. | 600/455 |
| 5,469,851 A | * | 11/1995 | Lipschutz | 600/447 |
| 5,617,862 A | | 4/1997 | Cole et al. | 128/661.01 |
| 5,622,177 A | * | 4/1997 | Breimesser et al. | 600/459 |
| 5,832,923 A | | 11/1998 | Engeler et al. | 128/661.01 |
| 5,897,501 A | | 4/1999 | Wildes et al. | 600/447 |
| 5,905,692 A | | 5/1999 | Dolazza et al. | 367/123 |
| 6,013,032 A | | 1/2000 | Savord | 600/443 |
| 6,014,473 A | | 1/2000 | Hossack et al. | 382/294 |
| 6,102,863 A | * | 8/2000 | Pflugrath et al. | 600/447 |
| 6,111,816 A | | 8/2000 | Chiang et al. | 367/7 |
| 6,233,637 B1 | * | 5/2001 | Smyers et al. | 710/311 |
| 6,475,146 B1 | * | 11/2002 | Frelburger et al. | 600/437 |
| 6,506,160 B1 | | 1/2003 | Van Stralen et al. | 600/459 |
| 6,669,633 B2 | * | 12/2003 | Brodsky et al. | 600/437 |
| 2002/0167971 A1 | * | 11/2002 | Van Stralen et al. | 370/535 |
| 2003/0073894 A1 | * | 4/2003 | Chiang et al. | 600/407 |

FOREIGN PATENT DOCUMENTS

| | | |
|---|---|---|
| DE | 32 36 218 A | 4/1984 |
| EP | 1 118 875 A2 | 7/2001 |
| FR | 2 596 156 | 9/1987 |

* cited by examiner

Primary Examiner—Francis J. Jaworski
(74) Attorney, Agent, or Firm—Dorsey & Whitney LLP; W. Brinton Yorks, Jr.

(57) ABSTRACT

A diagnostic ultrasonic imaging system includes a scanhead having a plurality of transducer elements. A signal combiner, such a time-division multiplexer or a frequency-division multiplexer, is coupled to each of the transducer elements. The signal combiner combines the signals from the transducer elements into a composite signal and couples the composite signal to an ultrasonic processor through a wire or other communication link. A signal separator, such as a time-division demultiplexer or a frequency-division demultiplexer, is coupled to the link and recovers from the composite signal each of the signals from the transducer elements.

29 Claims, 8 Drawing Sheets

DIAGNOSTIC ULTRASONIC IMAGING SYSTEM HAVING COMBINED SCANHEAD CONNECTIONS

TECHNICAL FIELD

The invention relates to diagnostic ultrasonic imaging systems, and, more particularly, to a system having a communications link with relatively few channels coupling an ultrasonic scanhead to an ultrasonic processor.

BACKGROUND OF THE INVENTION

Ultrasonic diagnostic imaging systems are in widespread use for performing ultrasonic imaging and measurements. For example, cardiologists, radiologists, and obstetricians use ultrasonic imaging systems to examine the heart, various abdominal organs, or a developing fetus, respectively. Diagnostic images are obtained from these systems by placing a scanhead against the skin of a patient, and actuating ultrasonic transducer elements located within the scanhead to transmit ultrasonic energy into the body of the patient. In response, ultrasonic echoes are reflected from the interior structure of the body, and the returning acoustic echoes are converted into electrical signals by the transducer elements in the scanhead.

FIG. 1 shows an ultrasonic imaging system 10 according to the prior art. A scanhead 12 includes a handle portion 14 that supports a transducer assembly 16. The transducer assembly 16 is generally formed from a crystalline material, such as barium titanate or lead zirconate titanate (PZT), that is constructed to form an array of piezoelectric transducer elements 18 that are each capable of transmitting and receiving signals at ultrasonic frequencies. The transducer elements 18 thus formed may be arranged in a linear array, or alternatively, they may be arranged in a variety of two-dimensional configurations. A scanhead cable 20 is coupled to the scanhead 12 at one end, and to an ultrasonic processor 22 at the opposing end to permit the processor 22 and the scanhead 12 to communicate. The ultrasonic processor 22 contains a beamformer 24 capable of exchanging signals with the scanhead 12 to focus the ultrasonic signals emitted by the transducer assembly 16. Focus is achieved by controlling the relative time delays of the applied voltages on each element so that they are combined to produce a net ultrasonic signal focused at a selected point within the body being scanned. The focal point thus achieved can be moved on each successive transmitter excitation, so that the transmitted signals can be scanned across the body at various depths within the body without moving the transducer. Similar principles apply when the transducer receives a return echo from an interior region of the body. The voltages produced at the transducer elements 18 are individually delayed in time and then summed so that the net signal is dominated by the acoustic echoes reflected from a single receive focal point in the body. The focused signals may then be transferred to an image processor 26 located within the ultrasonic processor 22 for subsequent additional processing prior to displaying a visual image of the scanned region of the body on a visual display 28. A system controller 30 cooperatively interacts with the beamformer 24 and the image processor 26 to control the processing of the beamformed signals and the data flow from the beamformer 24.

The need for diagnostic images having a finer resolution and three-dimensional diagnostic images requiring a 2-dimensional array of transducer elements has progressively led to the development of systems with transducer assemblies that contain ever larger numbers of individual transducer elements 18. As a result, the transducer assembly 16 may contain individual transducer elements 18 in numbers that range from a few hundred elements to as many as three thousand. Generally, each transducer element 18 in the transducer assembly 16 must be coupled to the processor 22 by an individual coaxial line. Since all of the coaxial lines extend through the scanhead cable 20, the diameter of the scanhead cable 20 increases as the number of transducer elements 18 increases. Consequently, as transducer assemblies 16 increase in size, the scanhead cable 20 becomes increasingly more difficult to manipulate during ultrasonic procedures due to decreased cable flexibility and increased cable size and weight. As the size and complexity of transducer arrays steadily increases, the diameter and weight of the scanhead cable 20 can become prohibitively large.

One technique for allowing a scanhead 12 to be more easily manipulated is to use a communications link between the scanhead 12 and the ultrasonic processor 22 other than coaxial cables. For example, a radio or optical link could be used instead of coaxial cables. However, the need to couple a signal from each of a large number of transducer elements 18 to the processor 22 can be problematic for other reasons. For example, it can be difficult to avoid cross coupling between radio links, and it can be difficult to maintain a free "line-of-sight" between a scanhead 12 and an ultrasonic processor 22 needed for an optical link. Thus, although a radio or optical link can solve the problem of scanhead cable weight and flexibility, it creates other problems that are difficult to solve.

Some prior art ultrasonic imaging systems have employed circuitry in the scanhead 12 that have resulted in a reduction in the number of coaxial lines in the cable 20 extending between the scanhead 12 and the ultrasonic processor 22. Some of these prior art ultrasonic imaging systems were initially designed for scanheads having a relatively small number of transducer elements. When scanheads 12 having a larger number of transducer elements 18 were developed, they were adapted for use with the existing ultrasonic processors 22 by placing a multiplexer (not shown) in the scanhead 12. A beam could then be synthesized using signals from an aperture consisting of less than all of the transducer elements 18 in the scanhead 12 by using the multiplexer to selectively couple different groups of transducer elements 18 to the ultrasonic processor 22. An ultrasonic image was then obtained by a process of multiple transmission and receiving cycles in which the transmit aperture, receive aperture, or both, were repositioned using the multiplexer for each cycle.

While this approach was successful in adapting scanheads having a relatively large number of transducer elements 18 to ultrasonic processors having a lesser number of beamformer 24 input channels, this success did not come without a price. In particular, the need to perform multiple transmission and receiving cycles to obtain each ultrasonic image can greatly reduce the frame rate of the ultrasonic imaging system, thus making it relatively time consuming to obtain an ultrasonic image. In addition, the system is not capable of using the entire available aperture in the scanhead at any one time.

Another technique used in prior art ultrasonic imaging system that has resulted in a reduction in the number of coaxial cables in the scanhead cable 20 is to place pre-processing circuitry in the scanhead 12 that performs at least some of the processing functions performed by the beamformer 24. Pre-processing signals from the transducer elements 18 results in the signals from the transducer elements 18 being combined to produce a lesser number of signals that must be coupled through coaxial cables. As a result, using pre-processing circuitry in the scanhead 12 reduces the number of coaxial cables in the scanhead cable 20. Although this approach allows an overall reduction in the number of coaxial lines in the scanhead cable 20, significant shortcomings still exist. For example, the flexibility with which the ultrasonic processor 22 can interface with the scanhead 12 depending on the type of image being obtained and other factors is reduced because at least some of the functionality is fixed by the design of the scanhead 12. Further, in the event the transducer elements 18 assembly either wholly or partially fail, the scanhead 12, including relatively costly preprocessing circuitry, may have to be discarded along with the failed transducer elements 18.

Therefore, there is a critical need for a scanhead that can be coupled to an ultrasonic processor through a relatively thin cable or communications link having relatively few channels despite having a large number of elements without sacrificing the flexibility and functionality that can be obtained by simultaneously coupling all of the transducer elements to the ultrasonic processor through a relatively thick cable.

SUMMARY OF THE INVENTION

An ultrasonic diagnostic imaging system and method combines signals from respective transducer elements in an ultrasonic scanhead into a composite signal and couples the composite signal to an ultrasonic processor. The composite signal is then separated into its constituent components at the ultrasonic processor to recover the original signals from the transducer elements. As a result, a communications link having relatively few channels, such as relatively few coaxial cables, can be used to couple the composite signal from the scanhead to the ultrasonic processor. The signals from the transducer elements can be combined at the scanhead and then separated at the ultrasonic processor by time-division multiplexing or by frequency-division multiplexing.

DETAILED DESCRIPTION OF THE INVENTION

Figure 1:
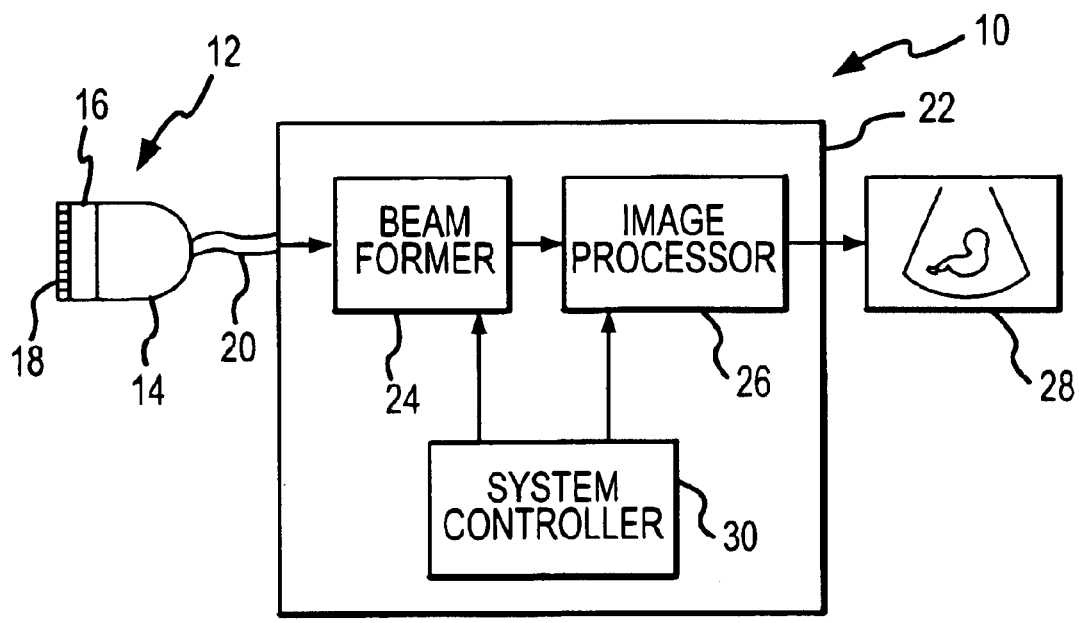
FIG. 1 is a block diagram of a conventional diagnostic ultrasonic imaging system having a relatively thick, heavy and inflexible cable used to connect a scanhead to an ultrasonic processor.
Figure 2:
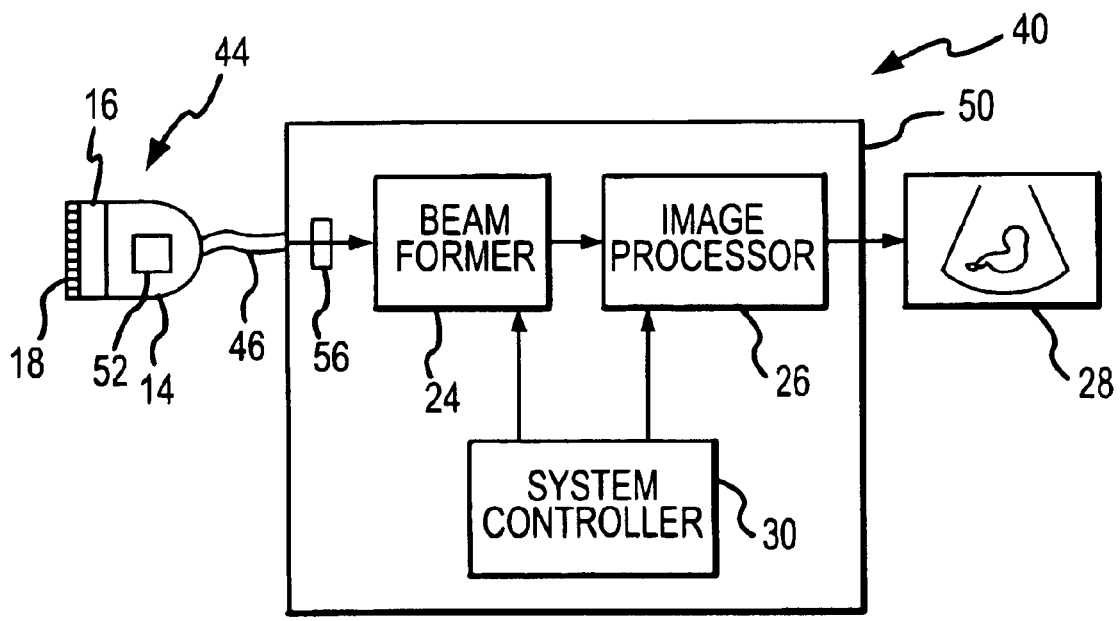
FIG. 2 is a block diagram of a diagnostic ultrasonic imaging system in accordance with one embodiment of the present invention having a relatively thin, light and flexible cable used to connect a scanhead to an ultrasonic processor.

One embodiment of a diagnostic ultrasonic imaging system 40 in accordance with the present invention is illustrated in FIG. 2. The system 40 is very similar to the system 10 of FIG. 1. Therefore, in the interest of brevity, identical components have been provided with the same reference numerals, and an explanation of their structure and operation will not be repeated. The system 40 of FIG. 2 differs from the system 10 of FIG. 1 by using a different scanhead 44 that allows for a relatively thin scanhead cable 46 coupling the scanhead 44 to an ultrasonic processor 50. The scanhead 44 is substantially identical to the scanhead 12 used in the system 10 of FIG. 1 except for the inclusion of a signal combiner 52, various embodiments of which will be explained below. Similarly, the ultrasonic processor 50 is substantially identical to the ultrasonic processor 22 used in the system 10 of FIG. 1 except for the presence of a signal separator 56, various embodiments of which will be explained below.

Figure 3:
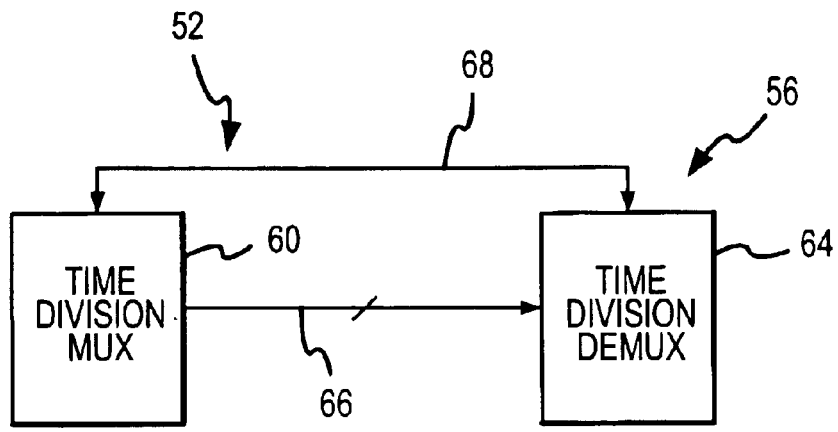
FIG. 3 is a block diagram of one embodiment of a scanhead and portion of an ultrasonic processor useable in the system of FIG. 2 employing time-division multiplexing.

One embodiment of the signal combiner 52 and signal separator 56 is shown in FIG. 3. In this embodiment, the signal combiner 52 is implemented using a time-division multiplexer 60, and the signal separator 56 is implemented using a time-division demultiplexer 64. The multiplexer 60 and demultiplexer 64 are coupled to each other through signal lines 66 and through at least one control line 68, all of which extend through the scanhead cable 46 (FIG. 2).

Figure 4:
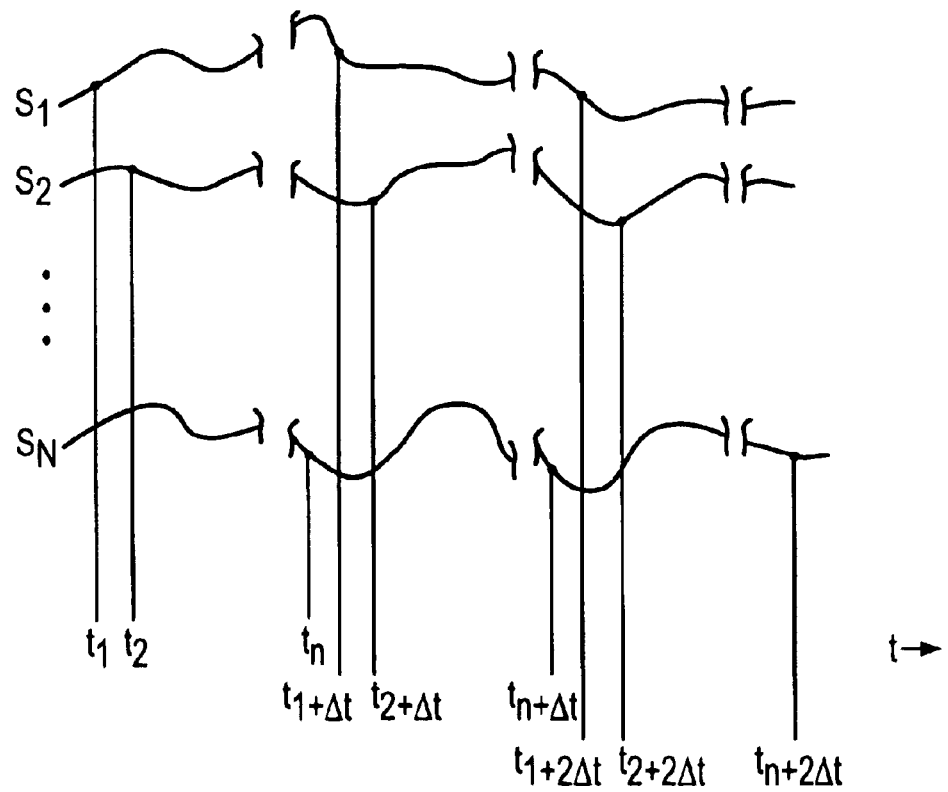
FIG. 4 is a waveform diagram illustrating the operation of the scanhead and processor of FIG. 3

The operation of the multiplexer 60 and demultiplexer 64 will now be explained with reference to FIG. 4. A shown in FIG. 4, a plurality of signals $S_1, S_2 \ldots S_N$ are generated by respective transducer elements 18. The transducer elements 18 are coupled to respective inputs of the time-division multiplexer 60, which samples the signals at respective times $t_1, t_2 \ldots t_N$; $t_{1+\Delta t}, t_{2+\Delta t} \ldots t_{N+\Delta t}$; $t_{1+2\Delta t}, t_{2+2\Delta t} \ldots t_{N+2\Delta t}$; etc. The signals may undergo other signal conditioning in the scanhead such as amplification. The samples are then applied to a signal line 66 and coupled through the signal line 66 to the time-division demultiplexer 64. The demultiplexer 64 applies the samples from the transducer elements 18 to respective output terminals to recreate the signals generated by the transducer elements 18. The timing $\Delta t$ is chosen to be the reciprocal of at least twice the highest frequency component of the signals from the transducer elements 18 so that all of the frequency components will be coupled through the signal line 66. The number of signal lines 66 needed will depend on the number of transducer elements 18, the maximum frequency component of the signals from the transducer elements 18, and the bandwidth of signal lines 66. In one embodiment, the signal from each of the transducer elements 18 is sampled at a 20 MHz rate so that the samples can retain all of the frequency components of the signal up to 10 MHz. The signal line 66 has a bandwidth of 500 MHz. As a result, the signal line 66 can couple the signals from 25 transducer elements 18. A scanhead 44 having 200 transducer elements 18 would thus require 8 signal lines 66. A signal line which is particularly advantageous is a fiber optic link, the broad spectrum of which can accommodate channels for many transducer elements through wave division multiplexing (WDM) and other optical multiplexing techniques.

Signals from the beamformer 24 can be coupled to the scanhead 44 to transmit a pulse of ultrasonic energy in essentially the same manner. In fact, in some embodiments of the invention, the multiplexer 60 and the demultiplexer 64 can be implemented with the same circuitry. In the interest of brevity, the various embodiments of the invention will be described for the purpose of coupling receive signals from the scanhead 44 to the ultrasonic processor 50. However, it will be understood that the same technique can be used to couple transmit signals from the ultrasonic processor 50 to the scanhead 44. Also, the transmit signals, including timing information, are normally generated by the beamformer 24 in digital form, and these digital signals can therefore be efficiently coupled to the scanhead 44.

Figure 5:
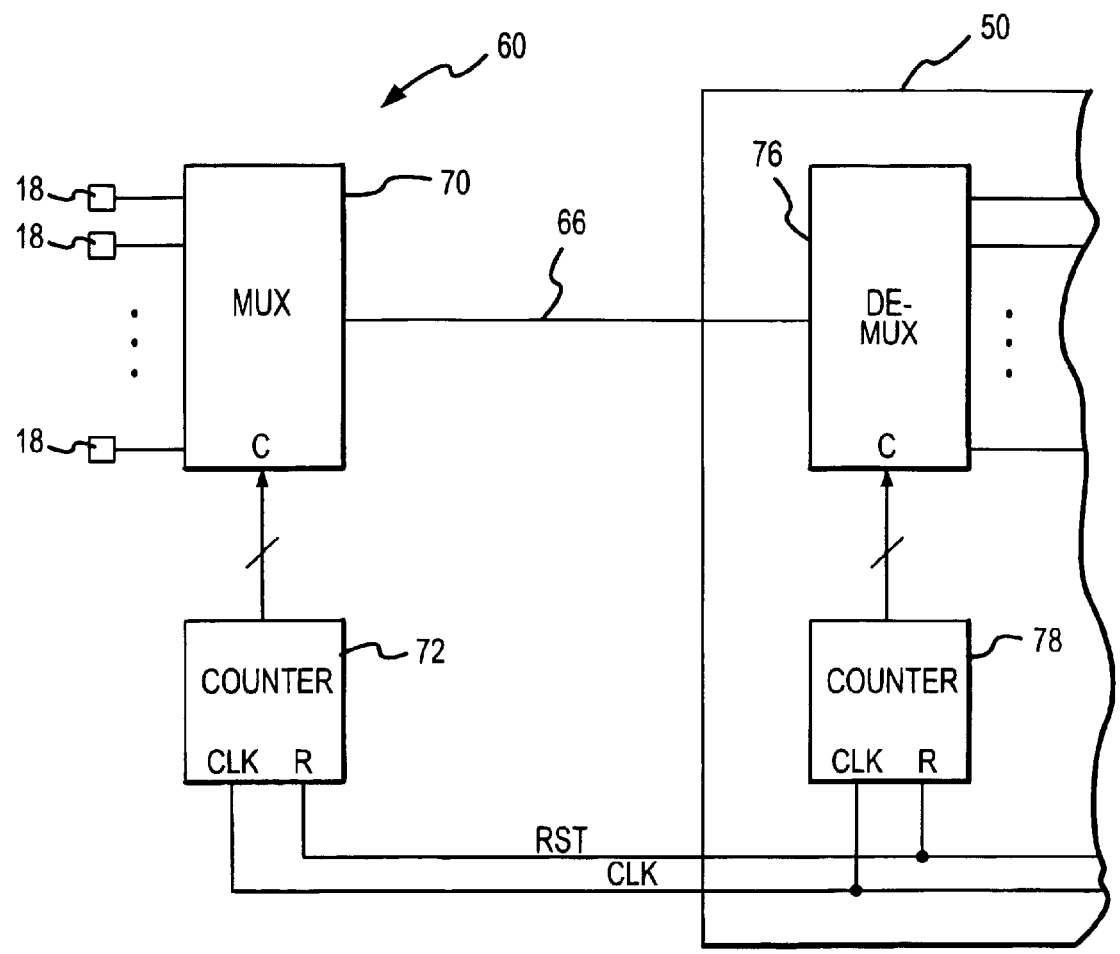
FIG. 5 is a block diagram of one embodiment of a scanhead and portion of an ultrasonic processor useable in the time-division multiplexing embodiment of FIG. 3.

One embodiment of the time-division multiplexer 60 and the time-division demultiplexer 64 is shown in FIG. 5. The time-division multiplexer 60 is implemented with a conventional multiplexer circuit 70 having input terminals coupled to respective transducer elements 18 and a single output terminal that is coupled to the signal line 66. The multiplexer circuit 70 is controlled by signals from a counter 72 that is clocked by a CLK signal from the ultrasonic processor 50 and reset by a RST signal from other circuitry (not shown) in the ultrasonic processor 50. The time-division demultiplexer 64 in the ultrasonic processor 50 is similarly implemented with a de-multiplexer circuit 76 controlled by signals from a counter 78. The counter 78 is clocked and reset by the same CLK and RST signals used to clock and reset the counter 72.

In operation, the counters 72, 78 are initially reset by a RST pulse so that the counter 72 couples the first transducer element 18 to the signal line 66 and the de-multiplexer 76 couples the signal line 66 to a first output terminal. The counters 72, 78 are then sequentially incremented by CLK pulses, thereby causing the multiplexer 70 to couple successive transducer elements 18 to the signal line 66. At the same time, the de-multiplexer 76 couples the signal line 66 to a corresponding output terminal of the de-multiplexer 76. The output terminals of the de-multiplexer 76 are coupled to the same components of the ultrasonic processor 50, such as the beamformer 24, that a conventional scanhead 12 having a relatively thick, heavy and inflexible scanhead cable 20 would be coupled to.

Figure 6:
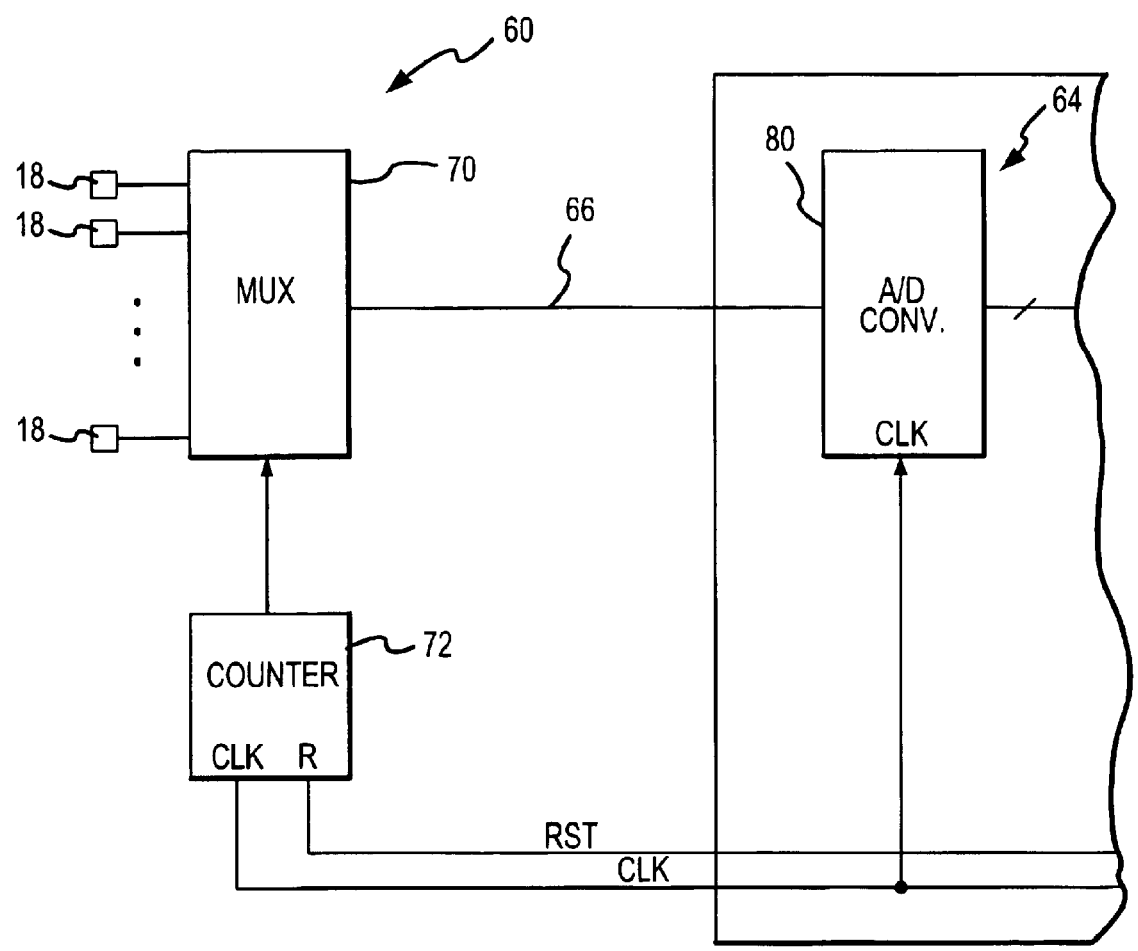
FIG. 6 is a block diagram of another embodiment of a scanhead and portion of an ultrasonic processor useable in the time-division multiplexing embodiment of FIG. 3.

FIG. 6 shows another embodiment of a time-division demultiplexer 64 that is usable with the time-division multiplexer 60 of FIG. 5. The time-division demultiplexer 64 is implemented with an analog-to-digital ("A/D") converter 80 that is controlled by the same CLK signal that is applied to the counter 72. In this embodiment, the time-division multiplexer 60 operates in the same manner as described above with reference to FIG. 5. The A/D converter 80 determines the amplitudes of the samples present on the signal line 66 and generates corresponding digital values. The digital values are applied to circuitry in the ultrasonic processor 50 that is "downsteam" from circuitry that is normally coupled to the scanhead. For example, the signals from the transducer elements 18 are typically coupled to an A/D converter in the beamformer 24. In the embodiment shown in FIG. 6, the output of the A/D converter 80 would be coupled to the beamformer 24 at the same location that the outputs of the A/D converter in the beamformer would normally be connected.

In operation, the ultrasonic processor 50 initially applies a RST pulse to the counter 72. The counter 72 then applies a digital value to the multiplexer 70 that causes to cause the multiplexer 70 to couple the first transducer element 18 to the signal line 66. The first CLK pulse then increments the counter 72 to cause the multiplexer 70 to couple the second transducer element 18 to the signal line 66. However, before the counter 72 and the multiplexer 70 can respond to the CLK pulse, the CLK pulse causes the A/D converter 80 to output a digital word indicative of the amplitude of the sample of the signal from the first transducer element 18. Digital words corresponding to the amplitude of samples from the remaining transducer elements 18 are obtained in the same manner.

Figure 7:
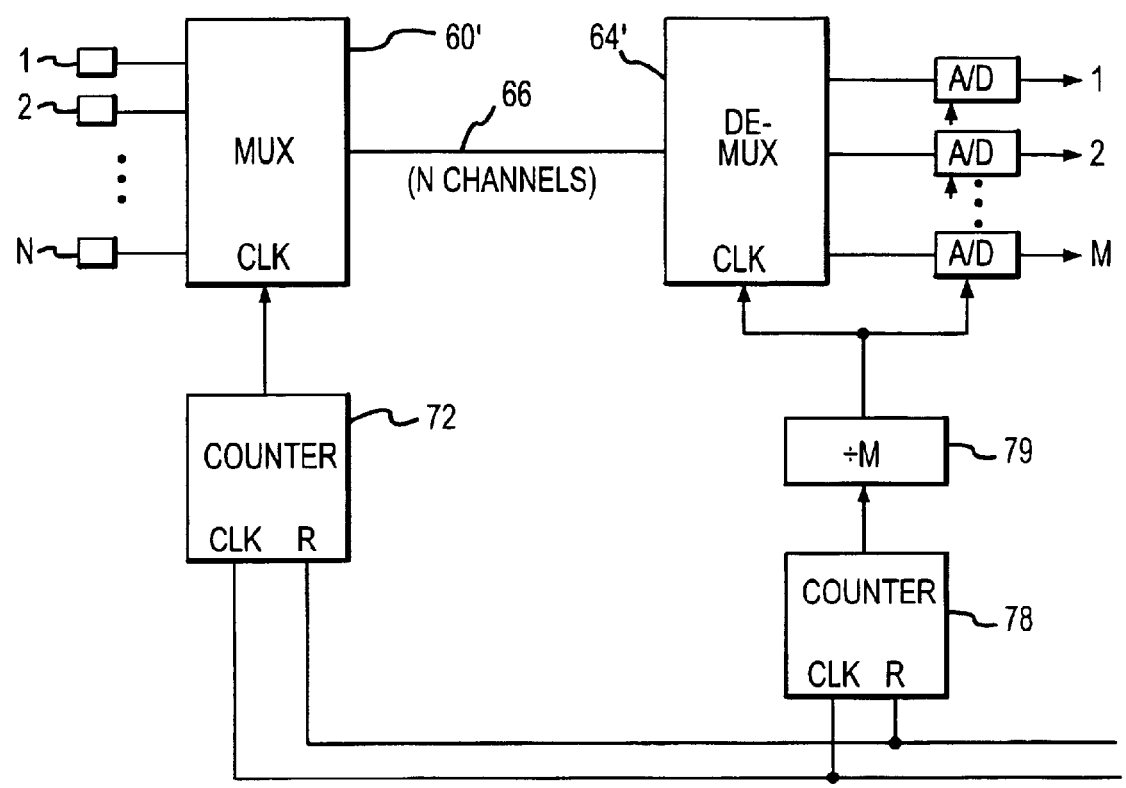
FIGS. 7 and 11 are block diagrams of another embodiment of a scanhead and portion of an ultrasonic processor useable in the time-division multiplexing embodiment of FIG. 3.
Figure 11:
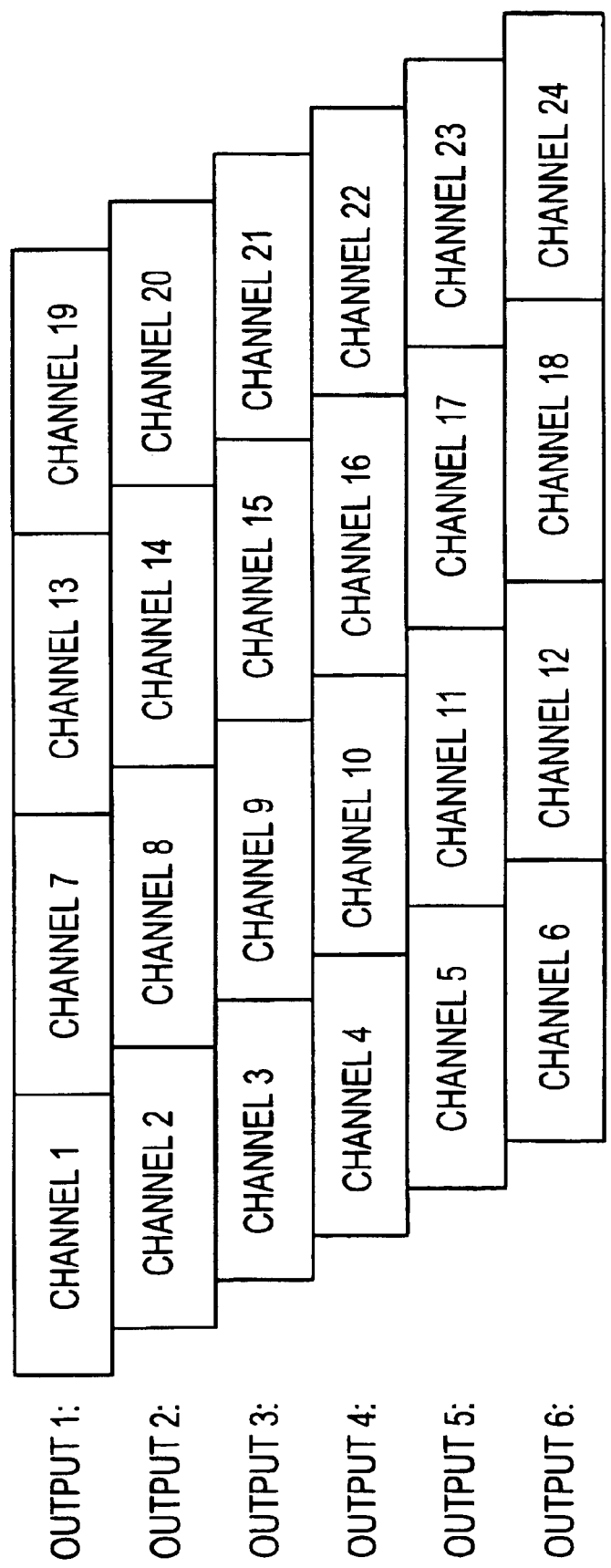

Another embodiment of a time-division de-multiplexer is illustrated in FIG. 7. In the example of a 20 MHz sample rate and a 500 MHz communication link bandwidth, it may be prohibitively expensive to employ an A/D converter operating at 500 MHz. Lower frequency A/D converters operating at 80 MHz are more practical and economical. At this lower frequency an analog multiplexer 60' in the scanhead can be used to multiplex multiple signals, for instance 24 signals from 24 transducer elements, into a single cable. At the ultrasound system side of the cable, an analog demultiplexer 64' is operated at a fraction of the modulation rate, for instance one-sixth the rate of the multiplexer 60', to generate six analog outputs, each comprising four time division multiplexed signals. The demultiplexer includes a sample-and-hold circuit on each output. Furthermore, the demultiplexer outputs are progressively offset from each other by one CLK interval, so that a different set of four channels are presented on each output (as shown in the example in FIG. 11). The clocking signal for the demultiplexer 64' may be developed by dividing the output of counter 78 by M as shown by divide-by-M circuit 79 in FIG. 7. The demultiplexer outputs are coupled to six A/D converters, each operating at the same rate as the demultiplexer 64', which in this example is one-sixth the rate of the multiplexer 60'. The four channels time-multiplexed in the output stream of each A/D converter are then de-multiplexed in the digital domain as described above.

Figure 8:
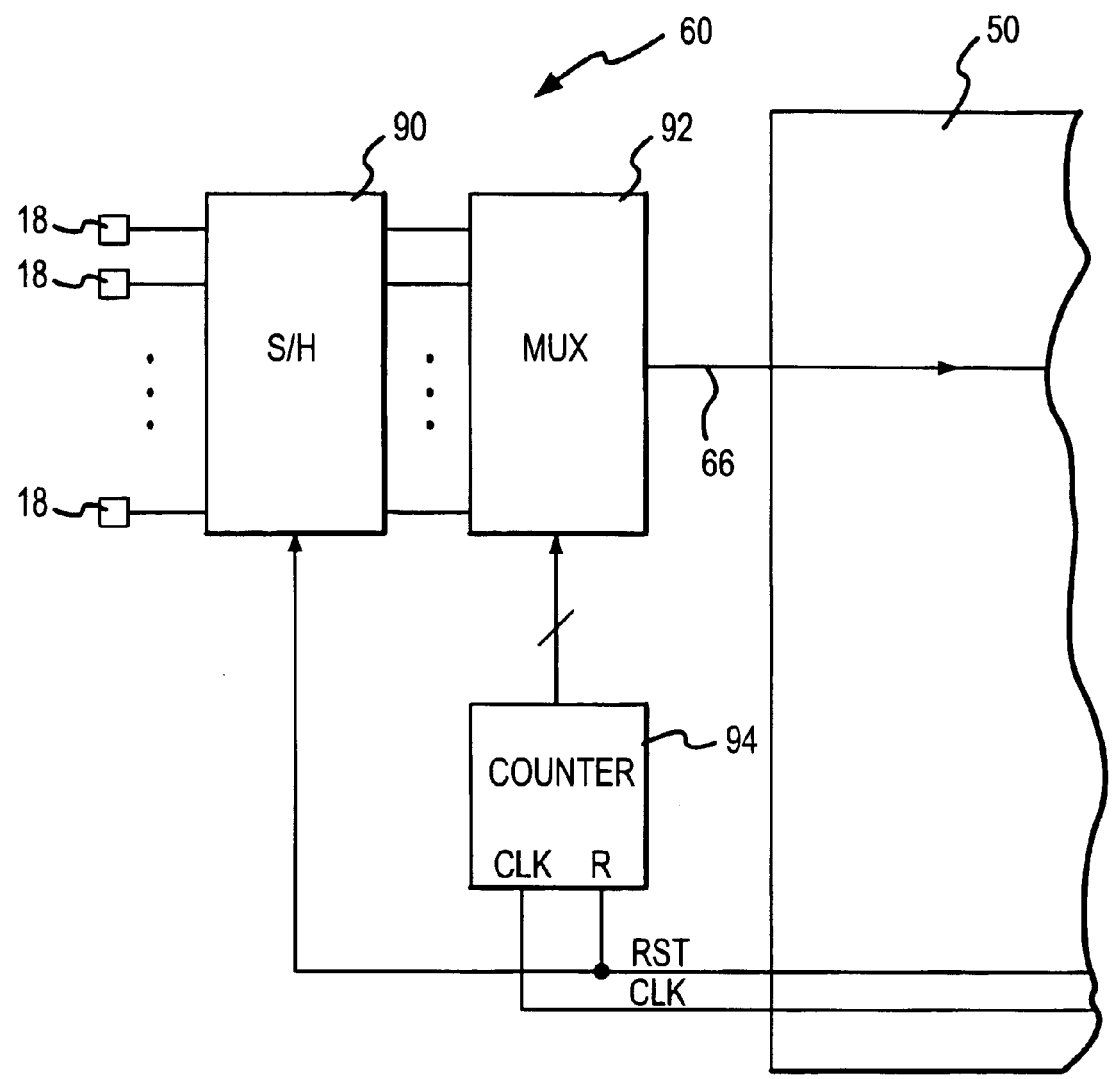
FIG. 8 is a block diagram of another embodiment of a scanhead useable in the time-division multiplexing embodiment of FIG. 3.

FIG. 8 shows another embodiment of a time-division multiplexer 60 that is usable with the time-division demultiplexers 64 of FIGS. 5, 6 or 7. The function performed by the time-division multiplexer 60 of FIG. 8 differs from the function performed by the time-division multiplexer 60 of FIG. 5 in the timing at which the signals from the transducer elements 18 are sampled. In the time-division multiplexer 60 of FIG. 5, the signals from the transducer elements 18 are sampled at different times. The relative delay of obtaining the samples must be taken into account when processing the signals from the transducer elements 18 in the beamformer 24. As a result, the processing of the signals in the beamformer 24 is more complex than in a conventional diagnostic ultrasonic imaging system in which the signals from the transducer elements 18 can be sampled at any time.

The time-division multiplexer 60 of FIG. 8 is implemented with a sample-and-hold ("S/H") circuit 90, a multiplexer circuit 92 and a counter 94, which controls the operation of the multiplexer circuit 92. In operation, the ultrasonic processor 50 generates a RST pulse that the causes the S/H circuit 90 to simultaneously sample the signals at respective outputs from all of the transducer elements 18. The RST pulse also reset the counter 94, thereby causing the multiplexer circuit 92 to couple a first output from the S/H circuit 90 to the signal line 66. Subsequent CLK pulses sequentially couple the remaining outputs from the S/H circuit 90 to the signal line 66. After all of the outputs from the S/H circuit 90 have been coupled to the signal line 66, the RST pulse is generated to again sample the signals from all of the transducer elements 18.

The above-described embodiments of the signal combiner 52 and signal separator 56 of FIG. 2 use time-division multiplexing. However, the signal combiner 52 and signal separator 56 may alternatively use other means, such as frequency-division multiplexing. For example, with reference to FIG. 9, each transducer element 18 is coupled to a respective modulator 100, which may be, for example, a frequency modulator, a phase modulator or an amplitude modulator. The outputs of the modulator 100 are coupled to a summer 102. Each of the modulators 100 is operated in a different frequency band, and a carrier signal within that band is modulated, such as through amplitude modulation ("AM"), frequency modulation ("FM") or phase modulation ("PM"), by the signal from the respective transducer element 18. The AM may be double-sideband amplitude modulation or, to double the bandwidth efficiency, single-sideband amplitude modulation. As illustrated in FIG. 10, the first modulator 100a operates in a frequency band extending from $f_0$ to $f_{0+\Delta f}$, the second modulator 100b operates a frequency band extending from $f_{0+\Delta f}$ to $f_{0+2\Delta f}$, etc. The width of the frequency band $\Delta f$ is chosen to be at least twice the highest frequency component of the signals from the transducer elements 18 so that all of the frequency components will be coupled through the signal line 66.

Figure 9:
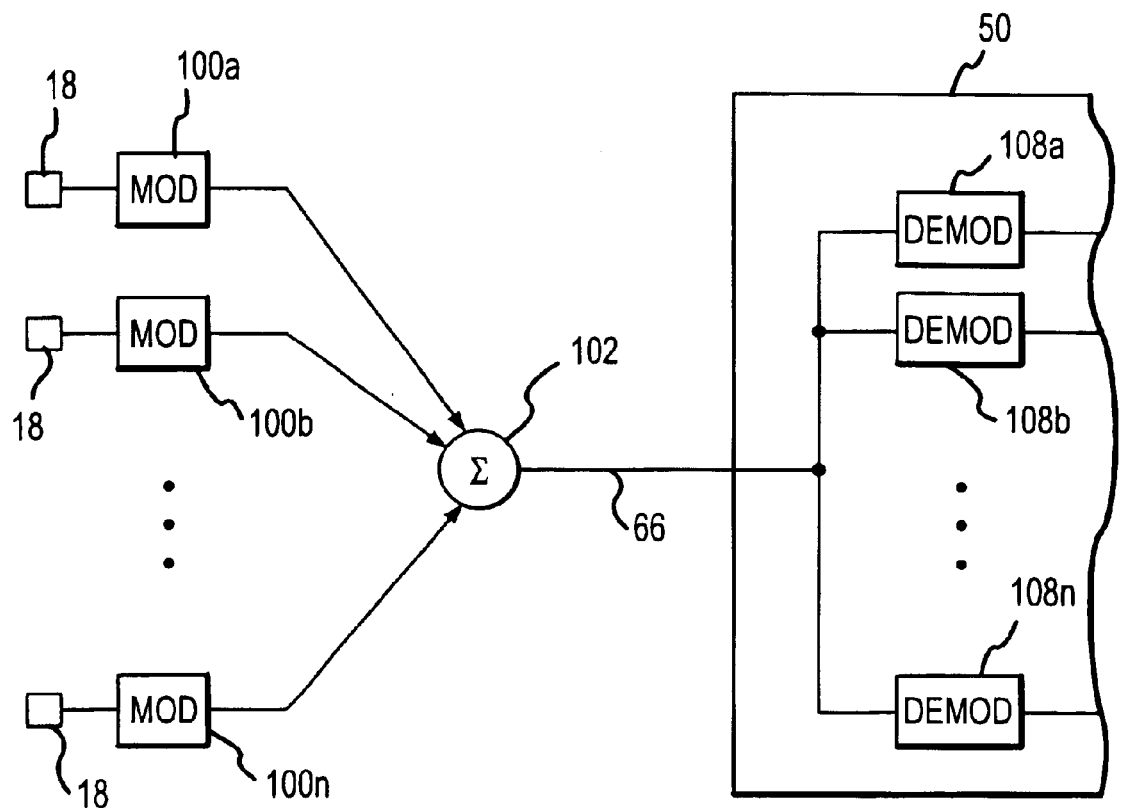
FIG. 9 is a block diagram of one embodiment of a scanhead and portion of an ultrasonic processor useable in the system of FIG. 2 employing frequency multiplexing.
Figure 10:
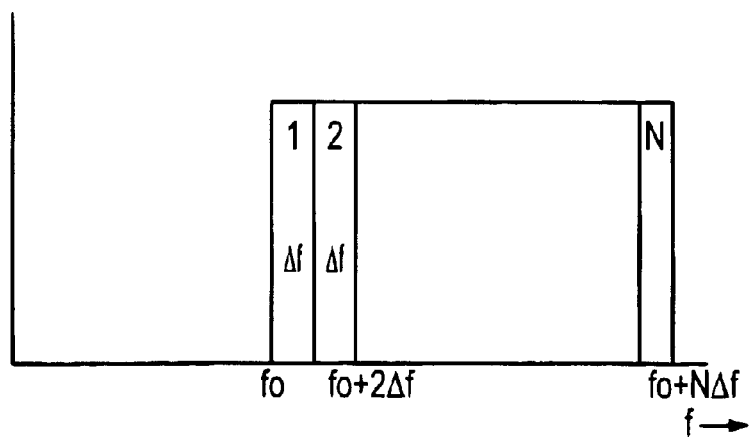
FIG. 10 is a frequency spectrum diagram illustrating the operation of the scanhead and processor of FIG. 9.

Although the embodiment of FIG. 9 has been explained in the context of the transducer elements 18 each producing a voltage corresponding to the amplitude of reflected ultrasound, other techniques are also possible. For example, the transducer elements 18 may be variable reactance acoustic transducer elements, which can be fabricated using MEMS techniques. The capacitance of each variable reactance acoustic transducer element would be a function of ultrasound amplitude. Each variable reactance acoustic transducer element would be used in an oscillator circuit (not shown) to determine the operating frequency of the oscillator. The operating frequency of the oscillator would therefore be indicative of the amplitude of the ultrasonic echoes. The signal from the oscillator would then be used to modulate a respective modulator 100.

A composite signal at the output of the summer 102 is coupled through the signal line 66 to a set of demodulators 108, one of which is provided for each modulator 100. Each demodulator 108 operates in the same frequency band that a corresponding modulator 100 operates in so that each demodulator 108 recovers the output signal from a corresponding transducer element 18. The signals at the output of the demodulators 108 are coupled to a beamformer 24 in the ultrasonic processor 50 at the same location at which signals from transducer elements 18 individually coupled through a scanhead cable 20 are coupled.

From the foregoing it will be appreciated that, although specific embodiments of the invention have been described herein for purposes of illustration, various modifications may be made without deviating from the spirit and scope of the invention. For example, although the various signal combiner and signal separator embodiments have been described as being coupled to each other through a signal line, other communications links could be used. For example a signal combiner could be coupled to a signal separator through a radio or optical communications link. Accordingly, the invention is not limited except as by the appended claims.

What is claimed is:

1. A diagnostic ultrasonic imaging system comprising:
   a scanhead having a plurality of transducer elements, each of the transducer elements having a transducer element terminal;
   a first multiplexer mounted in the scanhead having at least one first terminal and a plurality of second terminals coupled to respective ones of the transducer element terminals, the number of second terminals being substantially greater than the number of first terminals, the first multiplexer being structured to selectively couple each of the second terminals to a first terminal;
   a communications link coupled to each first terminal of the first multiplexer;
   a second multiplexer having a plurality of third terminals and at least one fourth terminal coupled to a first terminal of the first multiplexer through the communications link, the number of third terminals being substantially greater than the number of fourth terminals, the second multiplexer being operable to selectively couple each of the third terminals to a fourth terminal; and
   an ultrasonic processor containing the second multiplexer, the ultrasonic processor including a plurality of receivers coupled to the third terminals of the second multiplexer so that receive signals output from the transducer elements are coupled to the receivers through the first multiplexer, communications link and second multiplexer, the ultrasonic processor further including a plurality of transmitters coupled to the third terminals of the second multiplexer so that transmit signals output from the transmitters are coupled to the transducer elements through the second multiplexer, communications link and first multiplexer.

2. The diagnostic ultrasonic imaging system of claim 1 wherein the communications link comprises a wire.

3. The diagnostic ultrasonic imaging system of claim 1 wherein the first and second multiplexers comprise time-division multiplexers.

4. The diagnostic ultrasonic imaging system of claim 3 wherein the first multiplexer is responsive to a first digital control signal applied to a control input to couple the second terminals to the first terminals of the first multiplexer, and wherein the diagnostic ultrasound imaging system further comprises a first counter incrementing responsive to a clock signal received from the ultrasonic processor to generate a count to which the first digital control signal corresponds, the first counter being operable to apply the first digital control signal to the control input of the first multiplexer.

5. The diagnostic ultrasonic imaging system of claim 4 wherein the second multiplexer is responsive to a second digital control signal applied to a control input to couple each fourth terminal to the third terminals of the second multiplexer, and wherein the diagnostic ultrasound imaging system further comprises a second counter incrementing responsive to a clock signal received from the ultrasonic processor to generate a count to which the second digital control signal corresponds, the second counter being operable to apply the second digital control signal to the control input of the second multiplexer.

6. The diagnostic ultrasonic imaging system of claim 4 wherein the second multiplexer time comprises:
   an analog-to-digital converter having an input terminal coupled to the communications link and a plurality of digital output ports each coupled to one of the receivers and one of the transmitters, the analog-to-digital converter being responsive to the clock signal to convert a voltage level received from the communication link to a corresponding digital value and apply the digital value to the digital output ports.

7. The diagnostic ultrasonic imaging system of claim 3 wherein the first multiplexer comprises:
   a sample-and-hold circuit having a plurality of input terminals each of which is coupled to a respective transducer element, the sample-and-hold circuit being operable to retain a sample of a signal coupled from each of the transducer elements and to provide the samples on respective output terminals; and a first multiplexer circuit having a first plurality of terminals and a second terminal, the terminals in the first plurality being coupled to respective output terminals of the sample-and-hold circuit, the first multiplexer being responsive to a first digital control signal applied to a control input to couple the second terminal to each of the terminals in the first plurality.

8. The diagnostic ultrasonic imaging system of claim 7 wherein the second multiplexer comprises:

a second multiplexer circuit having a first plurality of terminals coupled to respective ones of the receivers and transmitters, and a second terminal coupled to the communications link, the second multiplexer circuit being responsive to a second digital control signal applied to a control input to couple the second terminal to each of the terminals in the first plurality.

9. The diagnostic ultrasonic imaging system of claim 7 wherein the second multiplexer comprises an analog-to-digital converter having an input terminal coupled to the communications link and a plurality of digital output ports coupled to the respective ones of the receivers and transmitters, the analog-to-digital converter being responsive to a clock signal to convert a voltage level received from the communication link to a corresponding digital value and apply the digital value to the digital output port.

10. The diagnostic ultrasonic imaging system of claim 1 wherein the first multiplexer comprises:

a plurality of first frequency-division multiplexers coupled to the transducer element terminals of respective transducer elements, each of the first frequency-division multiplexers generating a carrier signal modulated by an output signal from a respective transducer element, the modulated carrier signals from the first frequency-division multiplexers being in different frequency bands; and a signal summer coupled to receive the modulated carrier signals from the first frequency-division multiplexers and apply a composite signal to the communications link.

11. The diagnostic ultrasonic imaging system of claim 10 wherein the second multiplexer comprises a plurality of second frequency-division multiplexers substantially corresponding in number to the number of first frequency-division multiplexers, the second frequency-division multiplexers each having an input coupled to the communications link and an output coupled to a respective one of the receivers and a respective one of the transmitters.

12. The diagnostic ultrasonic imaging system of claim 11 wherein the first frequency-division multiplexers comprise respective amplitude modulators and wherein the second frequency-division multiplexers comprise respective amplitude demodulators.

13. The diagnostic ultrasonic imaging system of claim 11 wherein the first frequency-division multiplexers comprise respective frequency modulators and wherein the second frequency-division multiplexers comprise respective frequency demodulators.

14. A method of coupling receive signals from respective transducer elements in an ultrasonic scanhead to an ultrasonic processor and coupling transmit signals from an ultrasonic processor to respective transducer elements in the ultrasonic scanhead, the method comprising:

at the scanhead, combining the receive signals from a plurality of transducer elements into a composite receive signal;

coupling the composite receive signal from the scanhead to the ultrasonic processor;

at the ultrasonic processor, separating the composite receive signal into a plurality of components each of which corresponds to a receive signal from a respective transducer element;

at the ultrasonic processor, generating a plurality of transmit signals, and combining the transmit signals into a composite transmit signal;

coupling the composite transmit signal from the ultrasonic processor to the scanhead; and at the scanhead, separating the composite transmit signal in to a plurality of transmit signals, and coupling each of the transmit signals to a respective one of the transducer elements.

15. The method of claim 14 wherein the acts of coupling the composite receive signal from the scanhead to the ultrasonic processor and the composite transmit signal from the ultrasonic processor to the scanhead comprise coupling the composite receive signal from the scanhead to the ultrasonic processor and the composite transmit signal from the ultrasonic processor to the scanhead through a wire.

16. The method of claim 14 wherein the acts of coupling the composite receive signal from the scanhead to the ultrasonic processor and the composite transmit signal from the ultrasonic processor to the scanhead comprises coupling the composite receive signal from the scanhead to the ultrasonic processor and the composite transmit signal from the ultrasonic processor to the scanhead through an optical communications link.

17. The method of claim 14 wherein the act of coupling the composite receive signal from the scanhead to the ultrasonic processor comprises coupling the composite signal from the scanhead to the ultrasonic processor through a radio communications link.

18. The method of claim 14 wherein the act of combining the receive signals from a plurality of transducer elements into a composite receive signal comprises time-division multiplexing the receive signals from the transducer elements, and wherein the act of separating the composite receive signal into a plurality of components comprises time-division multiplexing the composite receive signal.

19. The method of claim 18 wherein the act of time-division multiplexing the receive signals from the transducer elements comprises sequentially coupling the receive signals from each of the transducer elements to the ultrasonic processor.

20. The method of claim 18 wherein the act of time-division multiplexing the receive signals from the transducer elements comprises:

sampling the receive signals from the plurality of transducer elements;

combining the samples; and coupling the samples from the scanhead to the ultrasonic processor.

21. The method of claim 20 wherein the act of sampling the receive signals from the plurality of transducer elements comprises sequentially sampling the receive signals from the plurality of transducer elements.

22. The method of claim 20 wherein the act of sampling the receive signals from the plurality of transducer elements comprises simultaneously sampling the receive signals from the plurality of transducer elements.

23. The method of claim 18 wherein the act of time-division multiplexing the composite receive signal comprises:

periodically determining the amplitude of the composite receive signal;

generating a digital value corresponding to each of the determined amplitudes; and coupling each of the digital values to the ultrasonic processor through a respective terminal of the ultrasonic processor.

24. The method of claim 18 wherein the act of time-division multiplexing the receive signals from the transducer elements comprises sequentially coupling each of the transducer elements to a communications link to create the composite receive signal, and wherein the act of time-division multiplexing the composite receive signal comprises sequentially coupling the communications link to each of a plurality of input terminals of the ultrasonic processor, the sequential coupling of the communications link to the input terminals being in synchronism with the coupling of the transducer elements to the communication link.

25. The method of claim 14 wherein the act of combining the receive signals from a plurality of transducer elements into a composite receive signal comprises frequency-division multiplexing the receive signals from the transducer elements to create the composite receive signal, and wherein the act of separating the composite receive signal into a plurality of components comprises frequency-division multiplexing the composite receive signal.

26. The method of claim 25 wherein the act of frequency-division multiplexing receive signals from a plurality of transducer elements comprises modulating carriers of different frequencies with each of the receive signals from the transducer elements, and wherein the act of frequency-division multiplexing the composite receive signal comprises modulating the composite receive signal to produce an output signal at each carrier frequency.

27. The method of claim 26 wherein the act of modulating carriers of different frequencies with each of the receive signals from the transducer elements comprises frequency modulating the carriers with respective output signals from the transducer elements, and wherein the act of modulating the composite receive signal comprises frequency modulating the composite receive signal.

28. The method of claim 26 wherein the act of modulating carriers of different frequencies with each of the receive signals from the transducer elements comprises amplitude modulating the carriers with respective output signals from the transducer elements, and wherein the act of modulating the composite receive signal comprises amplitude modulating the composite receive signal.

29. The method of claim 14 wherein the act of combining the transmit signals into a composite transmit signal comprises time-division multiplexing the transmit signals, and wherein the act of separating the composite transmit signal in to a plurality of transmit signals comprises time-division multiplexing the composite transmit signal.

* * * * *